United States Patent
Nishikawa (10) Patent No.: US 6,985,409 B2
(45) Date of Patent: Jan. 10, 2006

(54) RECORDING METHOD AND APPARATUS OF DOMAIN WALL DISPLACEMENT TYPE MAGNETO-OPTICAL RECORDING MEDIUM

(75) Inventor: Koichiro Nishikawa, Gunma (JP)

(73) Assignee: Canon Kabushiki Kaisha, Tokyo (JP)

( * ) Notice: Subject to any disclaimer, the term of this patent is extended or adjusted under 35 U.S.C. 154(b) by 551 days.

(21) Appl. No.: 10/316,950

(22) Filed: Dec. 12, 2002

(65) Prior Publication Data

US 2003/0123337 A1 Jul. 3, 2003

(30) Foreign Application Priority Data

Dec. 27, 2001 (JP) ............................. 2001-396727
Nov. 19, 2002 (JP) ............................. 2002-335099

(51) Int. Cl.
  *G11B 11/00* (2006.01)
(52) U.S. Cl. ............................. 369/13.54; 369/13.52; 369/13.47; 369/13.09
(58) Field of Classification Search ............. 369/13.54, 369/13.55, 13.52, 13.47, 13.06, 13.07, 13.08, 369/13.09; 428/694 ML, 694 MM
See application file for complete search history.

(56) References Cited

U.S. PATENT DOCUMENTS

| | | | |
|---|---|---|---|
| 5,572,502 A | 11/1996 | Naruse et al. | 369/116 |
| 5,953,289 A * | 9/1999 | Miyaoka | 369/13.24 |
| 6,027,825 A | 2/2000 | Shiratori et al. | 428/694 |
| 6,249,489 B1 * | 6/2001 | Fujii et al. | 369/13.54 |
| 6,249,490 B1 * | 6/2001 | Miyaoka | 369/13.14 |
| 6,345,016 B1 * | 2/2002 | Shiratori | 369/13.54 |
| 6,707,767 B2 * | 3/2004 | Hiroki | 369/13.38 |

FOREIGN PATENT DOCUMENTS

| | | |
|---|---|---|
| EP | 0 915 462 | 5/1999 |
| JP | 6-290496 | 10/1994 |

* cited by examiner

Primary Examiner—Tan Dinh
(74) Attorney, Agent, or Firm—Fitzpatrick, Cella, Harper & Scinto

(57) ABSTRACT

The present invention provides a method of recording information on a magneto-optical recording medium of domain wall displacement type having a preformat area and a data area succeeding thereto, comprising the steps of generating a reproduction signal from said medium by utilizing a light beam, detecting a reference position based on said reproduction signal, determining, based on a result of the detection, a recording start timing at which a formation of a recording magnetic domain is started at a distance at least not shorter than a displacement amount of a domain wall away from a start position of said data area; and starting a recording with said determined recording start timing.

7 Claims, 7 Drawing Sheets

RECORDING METHOD AND APPARATUS OF DOMAIN WALL DISPLACEMENT TYPE MAGNETO-OPTICAL RECORDING MEDIUM

BACKGROUND OF THE INVENTION

1. Field of the Invention

The present invention relates to a recording method and apparatus of a magneto-optical recording medium, in which reproduction of a recording magnetic domain is executed by displacing a domain wall of the recording magnetic domain in a domain wall displacement layer (hereinafter, referred to as "displacement layer") by light beam irradiation while not varying recorded data in a memory retaining layer (hereinafter, referred to as "memory layer") and detecting a change in a polarization plane of a reflected light of the light beam.

2. Related Background Art

For writable high-density recording, there is known a magneto-optical recording medium in which information is recorded by writing a magnetic domain in a magnetic thin film by thermal energy of a semiconductor laser and information is read out by the magneto-optical effect. It is recently requested to further increase the recording density of such magneto-optical recording medium to obtain a large-capacity recording medium.

The linear recording density of an optical disk such as a magneto-optical recording medium depends largely on the wavelength of the laser of a reproducing optical system and a numerical aperture of an objective lens. More specifically, once the laser wavelength $\lambda$ of the reproducing optical system and a numerical aperture NA of an objective lens are fixed, a diameter of a beam waist is determined, so that the detection limit of the spatial frequency at the reproduction of the recording magnetic domain becomes about $2NA/\lambda$. Consequently, in order to achieve a higher density in the conventional optical disk, it is necessary to reduce the wavelength of the laser of the reproducing optical system and to increase the numerical aperture NA of the objective lens. However, improvements in the wavelength of the laser and in the numerical aperture of the objective lens also have limitations. For this reason, there are being developed technologies for improving the recording density by improvements in the configuration of the recording medium and in the reading method.

For example, Japanese Patent Application Laid-open No. 06-290496 proposes a method and an apparatus for signal reproduction, after recording a signal in a memory layer in a multi-layered film including a displacement layer, a switching layer and a memory layer which are magnetically coupled, by displacing a domain wall of a recording magnetic domain in the displacement layer without varying data recorded in the memory layer, while utilizing a temperature slope generated on a recording medium by irradiation of a light beam for heating, magnetizing the displacement layer in such a manner that a substantially entire area of a reproducing light beam spot is uniformly magnetized, and detecting a change in a polarization plane of a reflected light of the reproducing light beam, thereby reproducing a recording magnetic domain equal to or smaller than a diffraction limit of the optical system.

This method allows to reproduce a recording magnetic domain of a periodicity equal to or smaller than the diffraction limit of the optical system, thereby providing a magneto-optical recording medium capable of significantly improving the recording density and the transfer rate, and a reproducing method thereof.

However, in the above-described magnetic wall displacing reproduction method in which the signal is reproduced by displacing the domain wall utilizing a slope in the temperature distribution formed on the recording medium, the state of the formed temperature distribution in an area of a non-uniform structure such as a preformatted area is different from that in a data area, and such difference may result in a defective data reproduction. More specifically, since the preformatted area does not have a grooved portion, this is, the preformatted area has no effect of a heat insulating effect by a wall of the groove, the heat is diffused and induces an insufficient temperature elevation, whereby a temperature distribution with a proper temperature slope cannot be formed. As a result, there is a problem that the displacement of the domain wall cannot be achieved properly and a defective data reproduction may result.

SUMMARY OF THE INVENTION

The present invention has been accomplished in consideration of the above-described problem, and an object of the present invention is to provide a recording method and apparatus capable of recording information on a magneto-optical recording medium of domain wall displacement type without error.

More specifically, another object of the present invention is to provide a method of recording information on a domain wall displacement type magneto-optical recording medium having a preformat area and a succeeding data area, comprising:

a step of generating a reproduction signal from the medium by utilizing a light beam;

a step of detecting a reference position based on the reproduction signal;

a step of determining, based on a result of the detection, a recording start timing at which a formation of a recording magnetic domain is started with a distance at least not smaller than a displacement amount of a domain wall from a start position of the data area; and a step of starting a recording at the determined recording start timing.

Still another object of the present invention is to provide an apparatus for recording information on a domain wall displacement type magneto-optical recording medium having a preformat area and a succeeding data area, comprising:

an optical pickup for generating a reproduction signal from the medium by utilizing a light beam;

a detection circuit for detecting a reference position based on the reproduction signal;

a clock counter for determining, based on a result of the detection, a recording start timing at which a formation of a recording magnetic domain is started with a distance at least not smaller than a displacement amount of a domain wall from the start position of the data area; and a controller for starting a recording at the determined recording start timing.

BRIEF DESCRIPTION OF THE DRAWINGS

FIG. 7 is a chart showing a wave form of a reproduction signal on an oscilloscope in case a signal is recorded and reproduced independently from the groove start end and the like;

DETAILED DESCRIPTION OF THE PREFERRED EMBODIMENTS

Figure 1A:
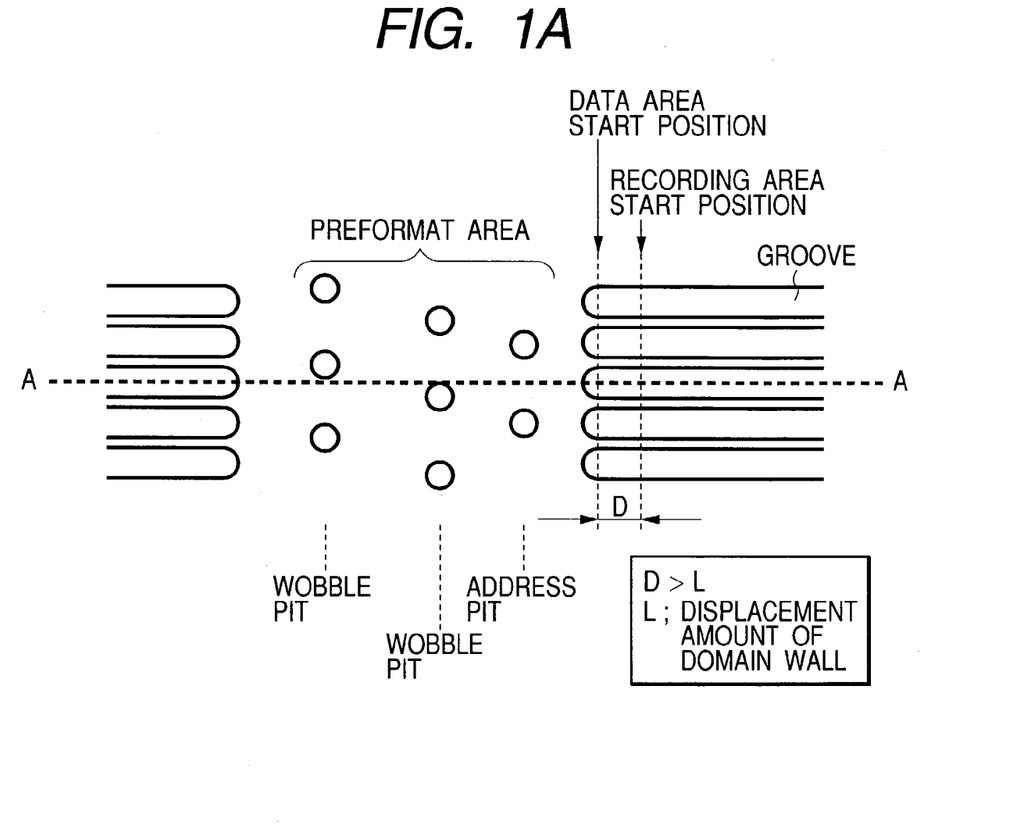
FIG. 1A is a view showing a preformat area of a magneto-optical recording medium in an embodiment of the present invention.
Figure 1B:
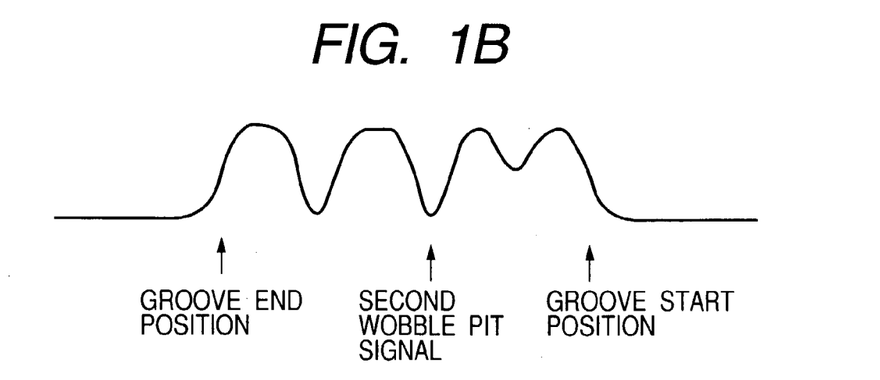
FIG. 1B is a view showing a preformat reproduction signal.

FIGS. 1A and 1B show an example of a preformat area of a magneto-optical recording medium of domain wall displacement type to be employed in the present invention and a reproduction signal obtained by reproducing such preformat area. FIG. 1A shows an example of the configuration of the preformat area, and FIG. 1B shows a reproduction signal thereof.

In the present embodiment, the preformat area consists of a pair of wobble pits for sample servo, an address pit and a mirror portion between the pits. A grooved portion succeeding thereto constitutes a data area. Then, such preformat area and such data area are alternately provided at a predetermined pitch to constitute an information track. In a direction perpendicular to the information track, the wobble pits have a pitch equal to twice the pitch of the grooved portions, since the wobble pit is used commonly by the adjacent information tracks. FIG. 1B shows a wave form of a signal reproduced when a light traces a broken line A—A of FIG. 1A.

In the present invention, in case of recording, on a medium of the configuration shown in FIGS. 1A and 1B, a magneto-optical signal to be reproduced by the domain wall displacement, the formation of a recording magnetic domain is started at a distance of a predetermined amount D away from the start position of the data area. In the present invention, the predetermined amount D is set to a value larger than a displacement amount of the domain wall at the time of reproduction by the domain wall displacement.

Now, there will be given an explanation on the displacement amount of the domain wall at the time of reproduction by the domain wall displacement.

Figure 2:
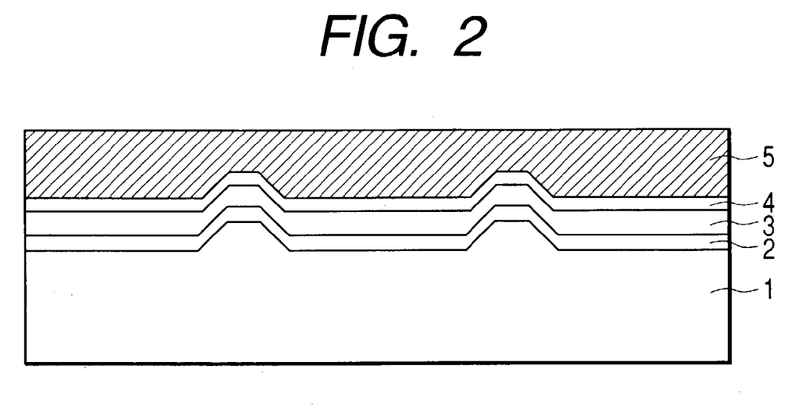
FIG. 2 is a schematic view showing a cross-sectional shape of a data area.

FIG. 2 is a schematic view showing the cross-sectional shape of the magneto-optical recording medium of the present embodiment. The layer configuration includes, from a light incident side, a substrate 1, an under layer 2, a magnetic layer 3, an upper layer 4 and a UV-cured resin layer 5. On the substrate, there is formed a land portion so as to be sandwiched between grooved portions of a large width. The grooves have a pitch of 0.54 µm, a width of about 0.40 nm in a half-value width, and a depth of about 50 nm. An inclined portion has an inclination angle of about 45°. The magnetic layer 3 on the land portion is denatured (in a longitudinally magnetized state) by an annealing treatment with a laser light, so that a magnetic coupling between the adjacent grooves is cut off.

Figure 3:
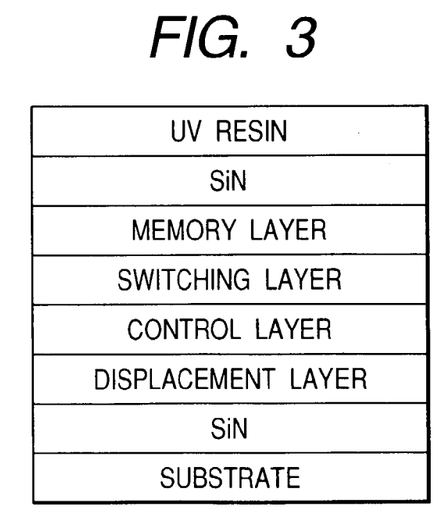
FIG. 3 is a view showing a detailed film configuration of the embodiment.

FIG. 3 illustrates the detailed configuration of a magnetic film of the present embodiment, formed by a polycarbonate substrate 1, an under layer 2, a magnetic layer 3, an upper layer 4 and a UV-cured resin 5.

The magnetic layer 3 in FIG. 2 has a four-layered configuration from a displacement layer (domain wall displacement layer) to a memory layer (record retaining layer) as shown in FIG. 3. Each of these layers has a material, a Curie temperature ($T_c$) and a film thickness shown below:

Displacement layer: GdFeCoCr, 300° C., 35 nm
Control layer: TbFeCoCr, 176° C., 15 nm
Switching layer: TbFeCr, 155° C., 10 nm
Memory layer: TbFeCoCr, 320° C., 80 nm.

Also the SiN under layer and the SiN upper layer have thicknesses respectively of 90 nm and 30 nm.

$T_c$ of each layer is realized by controlling the composition ratio of the components of each layer. In the present embodiment, the magnetic layer 3 has a four-layered configuration, but there may also be adopted a configuration with five or more layers in order to add other functions.

In the present embodiment, an optical head for recording and reproducing the aforementioned recording medium employs a light source of a wavelength of 650 nm and an objective lens of a numerical aperture (NA) of 0.60.

Also, each layer has following optical and thermal constants.

Under and upper layers: n=2.05, k=2.0 [W/mK], c=2.0×10$^3$ [J/m$^3$K];
Magnetic layer: n=2.50+i3.2, k=7.0 [W/mK], c=3.0×10$^3$ [J/m$^3$K];
Substrate, UV-cured resin: n=1.58, k=2.0×10$^1$ (W/mK), c=1.8×10$^3$ [J/m$^3$K];

wherein n is a complex refractive index in which a imaginary number portion contributes to a light absorption, k is a thermal conductivity and c is a specific heat capacity.

In the following there will be described results of an investigation on the domain wall displacement by an analysis on a light spot profile based on a vector analysis and an analysis on a light absorption amount of the thin film, by utilizing the aforementioned medium, and by a temperature distribution analysis utilizing a heat diffusion equation and the results of the foregoing analyses.

Figure 4A:
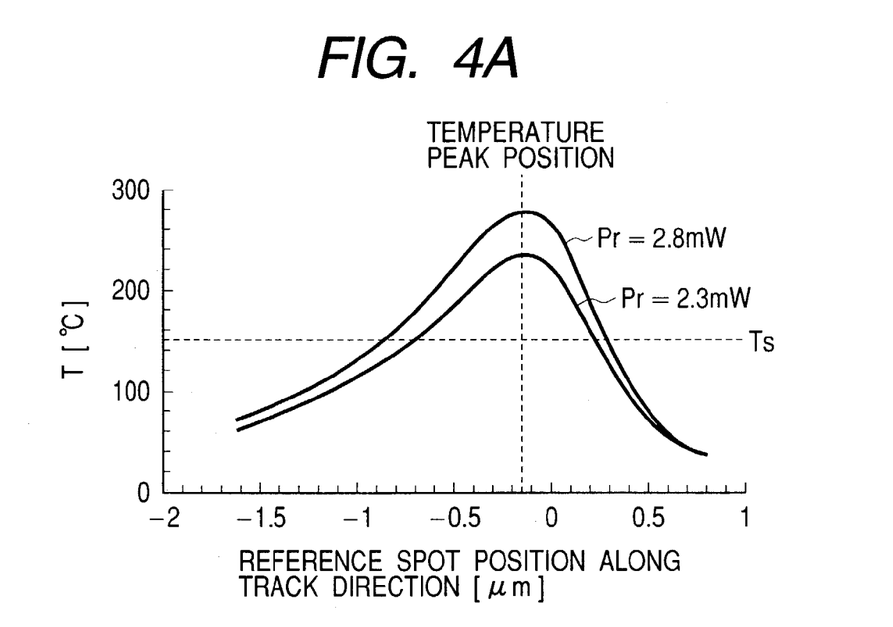
FIGS. 4A and 4B are charts showing a temperature distribution on a magnetic layer.
Figure 4B:
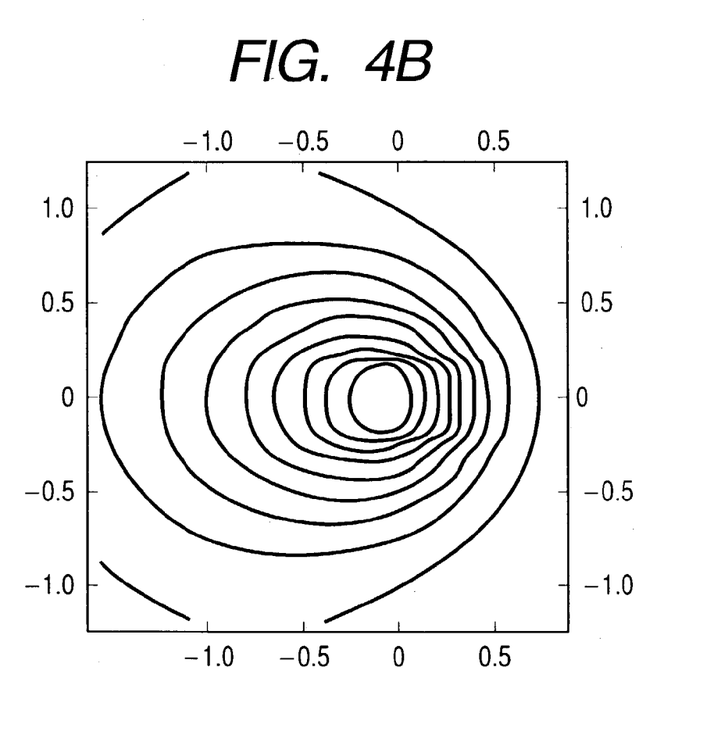

In the present embodiment, the linear velocity is 2.4 m/s, and FIGS. 4A and 4B show a temperature distribution on the magnetic layer in such state.

FIG. 4A shows a cross-sectional temperature distribution at a central position of the track, wherein the abscissa indicates a position in the direction of the track, taking the spot position as a reference. A relative proceeding direction of the spot is taken as positive. The temperature on the medium is almost in an equilibrium state, so that the temperature slope across the magnetic layer is almost none and is negligibly small.

In the aforementioned magneto-optical recording medium of the present embodiment, it is preferred, at the time of reproduction by displacement of the domain wall, that the temperature peak on the medium is sufficiently higher than the Curie temperature of the switching layer (indicated as $T_s$ in the drawing) and is not higher than about the Curie temperature of the displacement layer.

An optimum reproducing power for the medium in the present embodiment is about 2.3 mW to about 2.8 mW based on a recording-reproducing experiment. Such state has a temperature distribution as shown in FIG. 4A. As the room temperature, 27° C. is employed as a standard value. In such state, the isothermal line normalized by the peak value is independent of the reproducing power and becomes a form shown in FIG. 4B.

Referring to FIG. 4A, the displacement of the domain wall starts from a positive position of the abscissa where the temperature becomes $T_s$, and the domain wall moves to the position of the temperature peak. In this manner there is determined the displacement amount of the domain wall in the medium and the reproducing power of the present embodiment. The displacement of the domain wall can also start at a negative position of the abscissa where the temperature becomes $T_s$, but, in the medium of the present embodiment, the start of the displacement of the domain wall in such negative position is hindered by the control layer.

Specific values of the displacement amount of the domain wall in FIG. 4A are shown in the following, with two effective digits and including the case of a reproducing power of 3.0 mW (not shown in the drawings).

TABLE 1

| Reproducing power | Start point of displacement of domain wall | Temperature peak position | Displacement amount of domain wall |
| --- | --- | --- | --- |
| 2.3 mW | 0.22 μm | −0.14 μm | 0.36 μm |
| 2.8 mW | 0.28 μm | −0.14 μm | 0.42 μm |
| 3.0 mW | 0.30 μm | −0.14 μm | 0.44 μm |

From the foregoing, the displacement amount of the domain wall in the present embodiment does not exceed 0.5 μm.

Consequently, in the present embodiment, the predetermined amount D is set under the condition of $$D > 0.5 \ \mu m \quad (1).$$

In the following, a recording method will be explained so as to satisfy the condition (1).

In the aforementioned magneto-optical recording medium, the recording power is about 1.7 to about 2.0 times the reproducing power at the time of reproduction by the displacement of the domain wall. A recording power exceeding 2.0 time can also achieve satisfactory recording but results in a cross-writing of the data of an adjacent track, so that the value of the recording power is selected from above-mentioned range. This value corresponds to a value at the time of DC turn-on or an average value at the time of a pulsed turn-on.

Figure 5:
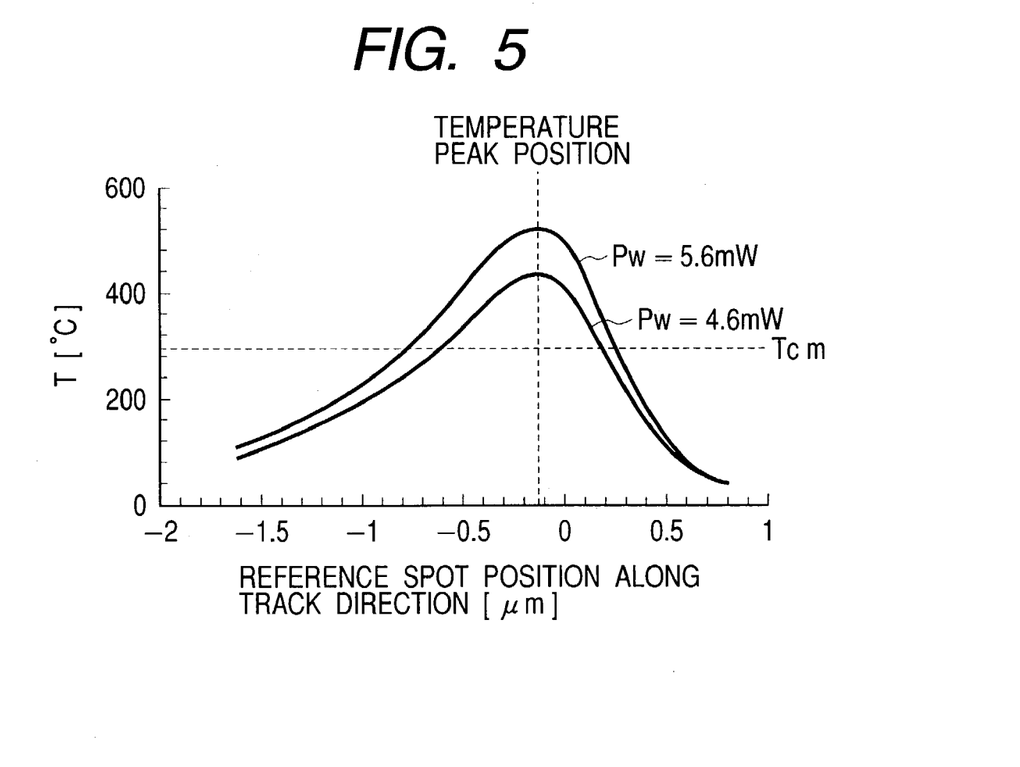
FIG. 5 is a chart showing a cross-sectional temperature distribution in a recording operation at a track center position.

FIG. 5 shows a cross-sectional temperature distribution at a central position of the track at the time of the recording. The recording power is 4.6 mW and 5.6 mW, which are respectively twice the aforementioned reproducing power of 2.3 mW and 2.8 mW.

As the recording is determined by a position where the memory layer reaches the Curie temperature ($T_c m$), an edge (domain wall) of a recorded mark is formed at the Curie temperature of the memory layer, at the rear of the proceeding direction of the spot.

Therefore, in order to achieve the recording satisfying the aforementioned condition (1), it is necessary to know the position of mark formation, with reference to the spot position.

Referring to FIG. 5, the position of mark formation becomes as follows.

TABLE 2

| Recording power | Position of mark formation |
| --- | --- |
| 4.6 mW | −0.58 μm |
| 5.6 mW | −0.75 μm |

Based on the foregoing and in consideration of a fact that a higher recording power provides the mark formation at a more rear position, the position of mark formation may be set to about 0.8 μm or larger behind the spot should be reserved, that is, $$Lw > 0.8 \ \mu m \quad (2).$$

Figure 6:
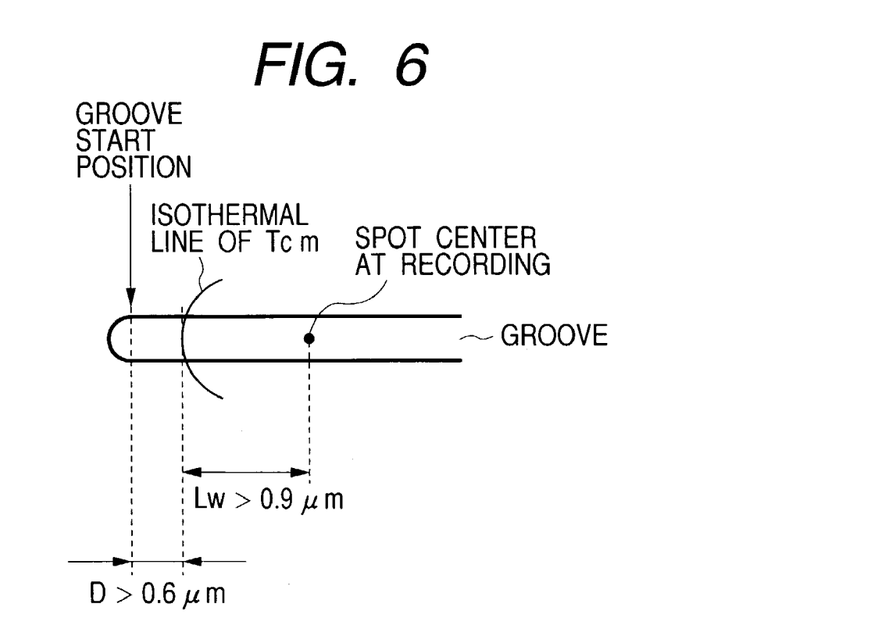
FIG. 6 is a view showing a relative relationship in position between a groove start end and a spot at the recording operation.

Therefore, at the recording operation, the recording can be started from a spot center position satisfying the conditions (1) and (2), and a distance at least D+Lw away from the start end of the groove. In the present embodiment, there were selected conditions of D≅0.6 μm and Lw≅0.9 μm.

Since the linear velocity is 2.4 m/s, after the detection of the groove start end signal, the recording was started at $(D+Lw)/2.4/10^6$ sec=$0.625 \times 10^{-6}$ sec=0.625 μsec.

In case of reproducing a recording magnetic domain, formed in the data area based on the aforementioned recording start timing, by displacement of the domain wall, the displacement of a domain wall, which is initially detected in the data area, is executed only within a uniform area (data area), namely within an area in which a proper temperature slope is formed. It is thus possible to achieve proper detection starting from the displacement of the domain wall which is at first detected in the data area and is most affected by the influence of the preformat area, thereby preventing the generation of a defective data reproduction.

Figure 7:
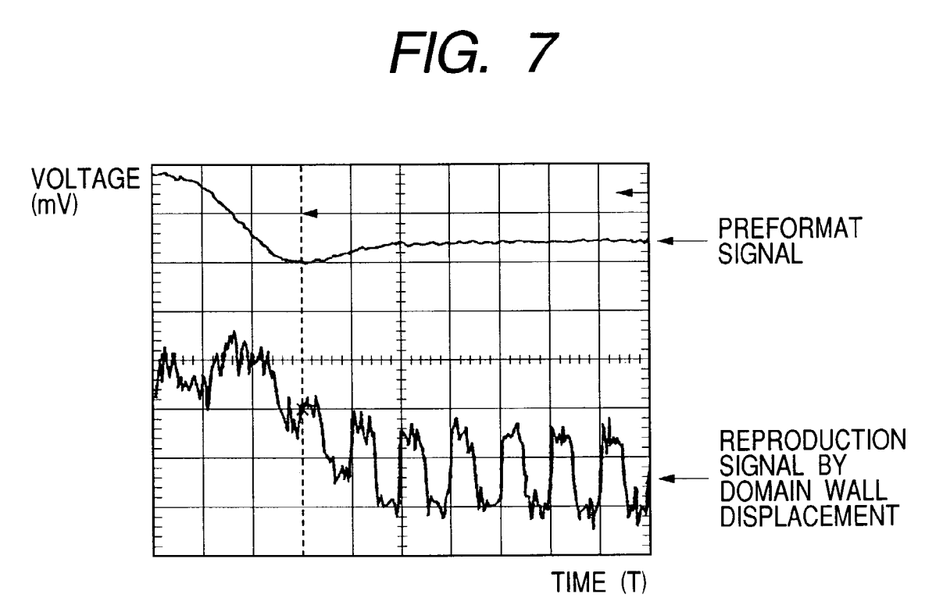

FIG. 7 shows a wave form on an oscilloscope, of a reproduction signal in case a signal is recorded and reproduced without relation to the start end of the grooves wherein an upper curve represents a preformat reproduction signal and a lower curve represents a reproduction signal with magnetic wall displacement. The divisions in the abscissa correspond, in distance, to 0.3 μm/div. The chart indicates that a satisfactory signal is obtained after about 2 divisions from the start end of the groove, namely after about 0.6 μm. Stated differently, a satisfactory signal is obtained after a distance corresponding to the displacement amount of the domain wall.

In the following there will be explained a circuit configuration for realizing the recording method of the present invention.

Figure 8:
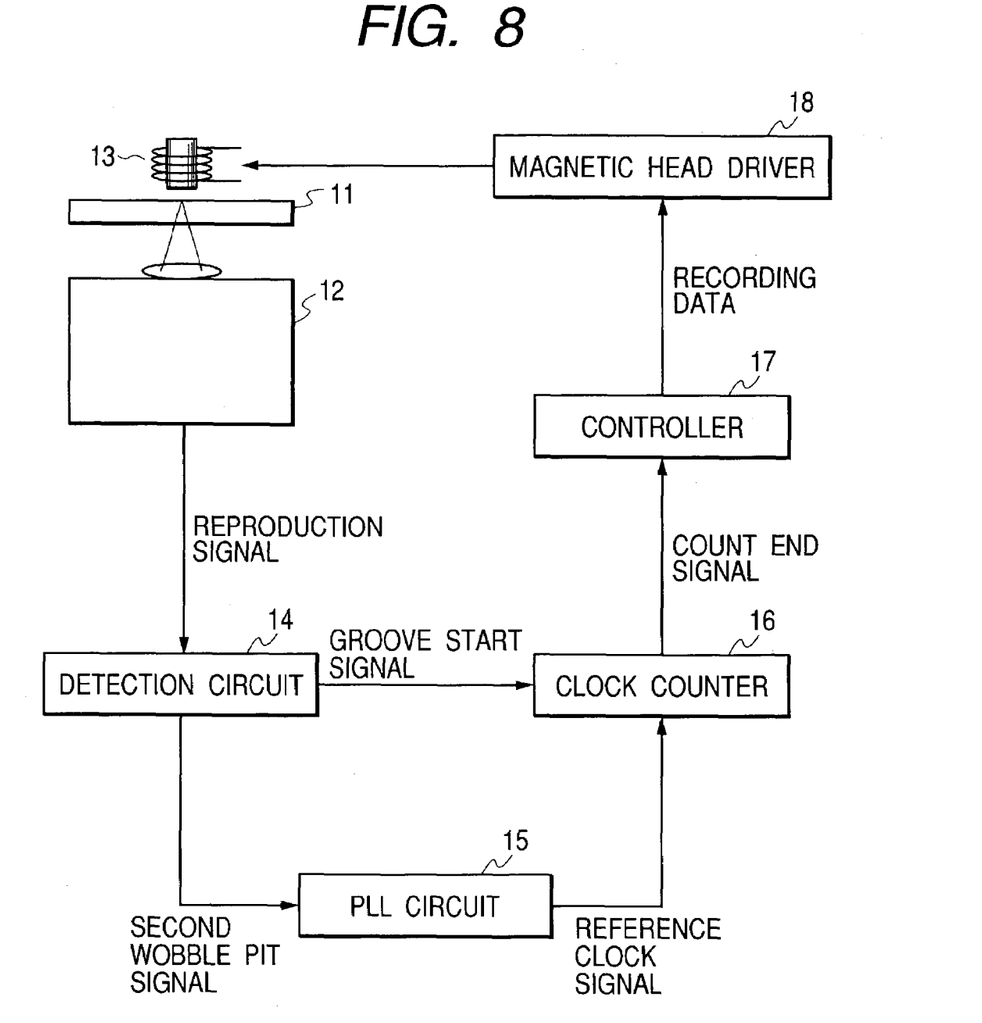
FIG. 8 is a diagram showing a circuit configuration for executing the present invention.

Referring to FIG. 8, there are shown a magneto-optical recording medium 11 rotated by a spindle motor (not shown in the drawings); an optical pickup 12; a magnetic head 13 for applying a modulated magnetic field corresponding to information to the magneto-optical recording medium; a detection circuit 14 for detecting a second wobble pit and a groove start end which is the start position of the data area from a reproduction signal detected by the optical pickup 12 and outputting a second wobble pit signal and a groove start end signal corresponding to respective timings of detection; a PLL circuit 15 for generating a reference clock signal of a predetermined frequency (f) synchronized with the second wobble pit signal; a clock counter 16 for starting counting of the reference clock signal utilizing the aforementioned groove start end signal as a trigger, and for outputting a count end signal after counting a predetermined count n; a controller 17 for detecting the input of the count end signal and outputting recording data to be recorded to the magneto-optical recording medium 11; and a magnetic head driver 18 for driving the magnetic head 13 based on the entered recording data.

Figure 9:
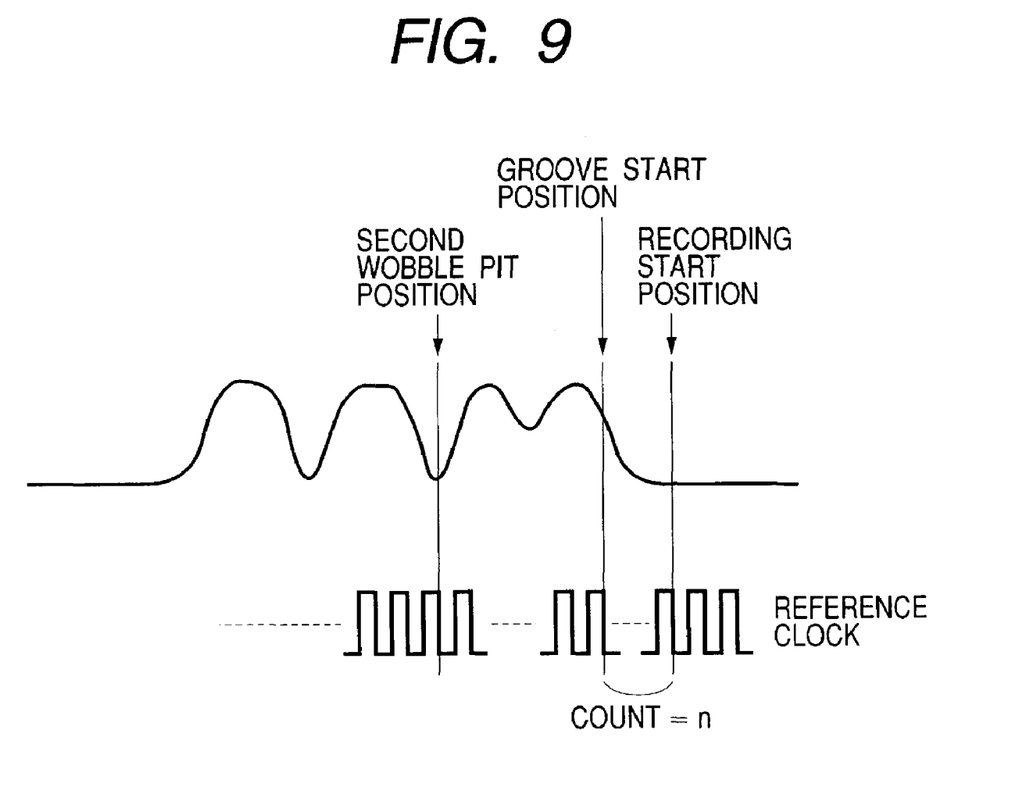
FIG. 9 is a chart showing a method of determining a recording start timing in the circuit shown in FIG. 8.

In the present embodiment, there is not provided an exclusive clock pit, as shown in FIG. 1A. Therefore the second wobble pit signal is used instead of the clock pit. Also the count number n set in the clock counter corresponds to the above-determined distance (D+Lw). More specifically, in case of a linear velocity of 2.4 m/s, a reference clock frequency of 45 MHz and a distance (D+Lw) of 1.5 µm, the clock count number is set at 28.

With the circuit configuration described above, a position distant by a distance (D+Lw) from the start position of the data area is measured, based on the groove start end signal, and the recording is started at a timing when the center position of the light spot reaches the measured position. As a result, on the magneto-optical recording medium 11, the recording of the recording magnetic domain starts from a position which is separated at least by the displacement amount of the domain wall from the start position of the data area.

The foregoing embodiment has been explained by a case employing a sample servo format, but the present invention is applicable also to a continuous servo format. Also in the foregoing embodiment, the clock counting is started on the basis of the groove start end of the preformat area, but it is also possible to provide an exclusive mark indicating a reference position in the preformat area and to start the clock counting on the basis of such mark, or to start the clock counting on the basis of an existing prepit. In such case, the clock count number has to be set in consideration also of the distance from the exclusive mark indicating the reference position or the prepit to the reproduction start position (groove start end).

What is claimed is:

1. A method of recording information on a magneto-optical recording medium of domain wall displacement type having a preformat area and a data area succeeding thereto, comprising the steps of:
   generating a reproduction signal from said medium by utilizing a light beam;
   detecting a reference position based on said reproduction signal;
   determining, based on a result of the detection, a recording start timing at which a formation of a recording magnetic domain is started at a distance at least not shorter than a displacement amount of a domain wall away from a start position of said data area; and
   starting a recording with said determined recording start timing.

2. A method according to claim 1, wherein said reference position is the start position of said data area.

3. A method according to claim 1, wherein said reference position is a prepit provided in said preformat area.

4. A method according to claim 2, wherein said preformat area comprises a wobble pit for tracking control, a clock pit and an address pit, and said recording start timing is determined by counting a reference clock generated based on said clock pit from a detection timing of said reference position.

5. A method according to claim 1, wherein said medium has a magnetic layer composed of a rare earth transition metal element and comprising a domain wall displacement layer for displacing the domain wall, a recording layer for retaining the recording magnetic domain, and a switching layer having a Curie temperature lower than those of said both layers and provided between said both layers.

6. A method according to claim 1, wherein said preformat area and said data area are alternately provided on an information track, and a magnetic coupling between said information tracks is cut off.

7. An apparatus for recording information on a magneto-optical recording medium of domain wall displacement type having a preformat area and a data area succeeding thereto, comprising:
   an optical pickup for generating a reproduction signal from said medium by utilizing a light beam;
   a detection circuit for detecting a reference position based on said reproduction signal;
   a clock counter for determining, based on a result of the detection, a recording start timing at which a formation of a recording magnetic domain is started at a distance at least not shorter than a displacement amount of a domain wall away from a start position of said data area; and
   a controller for starting a recording with said determined recording start timing.

* * * * *